United States Patent
Tang

(10) Patent No.: US 10,732,662 B2
(45) Date of Patent: Aug. 4, 2020

(54) BAND-GAP REFERENCE CIRCUIT

(71) Applicant: Wuhan Xinxin Semiconductor Manufacturing Co., Ltd., Wuhan, Hubei (CN)

(72) Inventor: Yuan Tang, San Jose, CA (US)

(73) Assignee: WUHAN XINXIN SEMICONDUCTOR MANUFACTURING CO., LTD., Wuhan, Hubei (CN)

(*) Notice: Subject to any disclaimer, the term of this patent is extended or adjusted under 35 U.S.C. 154(b) by 0 days.

(21) Appl. No.: 16/212,080

(22) Filed: Dec. 6, 2018

(65) Prior Publication Data

US 2019/0235562 A1 Aug. 1, 2019

(30) Foreign Application Priority Data

Jan. 26, 2018 (CN) .......................... 2018 1 0079260

(51) Int. Cl.
*G05F 3/26* (2006.01)
*G05F 1/565* (2006.01)
(Continued)

(52) U.S. Cl.
CPC .............. *G05F 3/267* (2013.01); *H02M 3/07* (2013.01); *G05F 1/565* (2013.01); *G05F 3/245* (2013.01);
(Continued)

(58) Field of Classification Search
CPC ... G05F 1/56; G05F 1/565; G05F 3/10; G05F 3/16; G05F 3/20; G05F 3/205; G05F 3/24;
(Continued)

(56) References Cited

U.S. PATENT DOCUMENTS

2011/0175593 A1* 7/2011 Ookuma ............... G05F 3/30
323/313
2012/0326695 A1* 12/2012 Chen ..................... G11O 5/145
323/313

(Continued)

FOREIGN PATENT DOCUMENTS

CN 201674390 U * 12/2010 .............. H02M 1/36
CN 201674390 U 12/2010
(Continued)

*Primary Examiner* — Jue Zhang
*Assistant Examiner* — David A. Singh
(74) *Attorney, Agent, or Firm* — Muncy, Geissler, Olds & Lowe, P.C.

(57) ABSTRACT

A band-gap reference circuit including a charge pump circuit and a reference circuit is disclosed. The charge pump circuit is powered by a supply voltage and thereby outputs a regulating voltage which is higher than the supply voltage and powers the reference circuit such that the reference circuit outputs a band-gap reference voltage. Powering the reference circuit with the regulating voltage that is made higher than the supply voltage by the charge pump circuit enables 1) normal operation of the band-gap reference circuit at the supply voltage that is lower than a lowest voltage required by the band-gap reference circuit; and 2) minimization (almost elimination) of fluctuations in the regulating voltage output from the charge pump circuit and hence a stable and more accurate band-gap reference voltage output from the band-gap reference circuit.

3 Claims, 2 Drawing Sheets

(51) Int. Cl.
*H02M 3/07* (2006.01)
*G05F 3/24* (2006.01)

(52) U.S. Cl.
CPC .............. *G05F 3/247* (2013.01); *G05F 3/262* (2013.01); *G05F 3/265* (2013.01)

(58) Field of Classification Search
CPC . G05F 3/245; G05F 3/247; G05F 3/26; G05F 3/262; G05F 3/267; H02M 3/07
See application file for complete search history.

(56) References Cited

U.S. PATENT DOCUMENTS

| | | | | |
|---|---|---|---|---|
| 2013/0033245 | A1* | 2/2013 | Wong | G05F 3/30 |
| | | | | 323/281 |
| 2013/0148456 | A1* | 6/2013 | Cho | G11O 5/145 |
| | | | | 365/226 |
| 2018/0017986 | A1* | 1/2018 | Lahiri | G05F 3/262 |
| 2019/0235547 | A1* | 8/2019 | Tang | G05F 1/575 |

FOREIGN PATENT DOCUMENTS

| | | |
|---|---|---|
| CN | 102681584 A | 9/2012 |
| CN | 102904421 A | 1/2013 |
| CN | 103076830 A | 5/2013 |
| CN | 106940580 A | 7/2017 |

* cited by examiner

US 10,732,662 B2

BAND-GAP REFERENCE CIRCUIT

CROSS-REFERENCE TO RELATED APPLICATION

This application claims the priority of Chinese patent application number 201810079260.0, filed on Jan. 26, 2018, the entire contents of which are incorporated herein by reference.

TECHNICAL FIELD

The present invention relates to the field of semiconductor technology and, in particular, to band-gap reference circuit.

BACKGROUND

A wide range of analog circuits are provided with voltage or current references in the form of DC quantities. Such DC quantities depend barely on power supply or process parameters, but usually have a predefined relationship with temperature. Such references are created in order to produce a DC voltage or current that is independent from power supply or process parameters but are associated with a predetermined temperature characteristic. In most applications, the desired temperature characteristic may be: 1) proportional to absolute temperature (PTAT), 2) a constant Gm characteristic, i.e. a transconductance constant of some transistors, or 3) independent from temperature. To implement a source of reference voltage, concerns are mainly involved in the control over temperature and power supply in order to achieve a predetermined relationship to temperature and a substantial independence from the power supply. As semiconductors almost have no temperature-independent parameters, the independence from temperature has to be achieved by appropriate combinations of selected power-independent parameters with positive and negative temperature coefficients. Moreover, these selected parameters shall be independent from power supply. A band-gap of a semiconductor is defined as the difference between the bottom of its conduction band and the top of its valence band. A band-gap voltage reference (also briefly known as band-gap) provides a temperature-independent voltage reference generated from a sum of a voltage proportional to temperature and a voltage drop across a diode, with temperature coefficients of them cancelling out. As this voltage reference is comparable to the band-gap voltage of silicon, it is also known as band-gap reference. Some conventional band-gap architectures may also adopt an output voltage different from the above band-gap voltage.

It is noted that in existing band-gap reference circuits, a relatively low power supply voltage may result in an inaccurate output voltage of the band-gap reference circuit.

SUMMARY OF THE INVENTION

It is an object of the present invention to provide a band-gap reference circuit that can be powered by a supply voltage that is lower than a lowest voltage required thereby.

To this end, the invention provides a band-gap reference circuit comprising a charge pump circuit and a reference circuit. The charge pump circuit is powered by a supply voltage and thereby outputs a regulating voltage which is higher than the supply voltage and powers the reference circuit so that the reference circuit outputs a band-gap reference voltage.

Optionally, in the band-gap reference circuit, the supply voltage may be 1.2 V, with the regulating voltage and the band-gap reference voltage being 2.4 V and 1.2 V, respectively.

Optionally, in the band-gap reference circuit, the reference circuit may include a first transistor and a second transistor with each of the transistors being implemented as a P-channel field-effect transistor, and wherein a source of the first transistor and a source of the second transistor are coupled to the regulating voltage and a gate of the first transistor is connected to a gate of the second transistor, and a drain of the second transistor is connected to the gate of the second transistor.

Optionally, in the band-gap reference circuit, the reference circuit may further comprise a third transistor and a fourth transistor with each of the third and fourth transistors being implemented as a P-channel field-effect transistor, and wherein a source of the third transistor is connected to a drain of the first transistor, a source of the fourth transistor is connected to the drain of the second transistor, a gate of the third transistor is connected to a gate of the fourth transistor, and a drain of the fourth transistor is connected to the gate of the fourth transistor.

Optionally, in the band-gap reference circuit, the reference circuit may further comprise a fifth transistor and a sixth transistor with each of the fifth and sixth transistors being implemented as an N-channel field-effect transistor, and wherein a source of the fifth transistor is connected to a drain of the third transistor, a source of the sixth transistor is connected to the drain of the fourth transistor, a gate of the fifth transistor is connected to a gate of the sixth transistor, and a drain of the fifth transistor is connected to the gate of the fifth transistor.

Optionally, in the band-gap reference circuit, the reference circuit may further comprise a seventh transistor and an eighth transistor with each of the seventh and eighth transistors being implemented as an N-channel field-effect transistor, and wherein a source of the seventh transistor is connected to the drain of the fifth transistor, a source of the eighth transistor is connected to a drain of the sixth transistor, a gate of the seventh transistor is connected to a gate of the eighth transistor, and a drain of the seventh transistor is connected to the gate of the seventh transistor.

Optionally, in the band-gap reference circuit, the reference circuit may further comprise a first triode and a second triode with each of the triodes being as a PNP triode, and wherein an emitter of the first triode is connected to the drain of the seventh transistor, an emitter of the second triode is coupled to a drain of the eighth transistor, a collector and a base of the first triode are both grounded, a collector and a base of the second triode are both grounded.

Optionally, in the band-gap reference circuit, the reference circuit may further comprise a first resistor which is connected to the emitter of the second triode at one end and to the drain of the eighth transistor at the other end.

Optionally, in the band-gap reference circuit, the reference circuit may further comprise a ninth transistor and a tenth transistor with each of the ninth and tenth transistors being implemented as a P-channel field-effect transistor, and wherein a source of the ninth transistor is coupled to the regulating voltage, a gate of the ninth transistor is connected to the gate of the second transistor and a drain of the ninth transistor is connected to a source of the tenth transistor, and a gate of the tenth transistor having a gate connected to the gate of the fourth transistor.

Optionally, in the band-gap reference circuit, the reference circuit may further comprise a second resistor and a third triode, the third triode implemented as a PNP triode, and wherein the second resistor is connected to a drain of the tenth transistor at one end and to an emitter of the third triode at the other end, and a collector and a base of the third triode are both grounded.

Optionally, in the band-gap reference circuit, further comprising a charge pump circuit and first to tenth transistors, wherein the charge pump circuit has a first input supplied with a supply voltage and an output which outputs a regulating voltage. Each of the first and second transistors is implemented as a P-channel field-effect transistor, a source of the first transistor and a source of the second transistor coupled to the regulating voltage, a gate of the first transistor connected to a gate of the second transistor, a drain of the second transistor connected to the gate of the second transistor. Each of the third and fourth transistors is implemented as a P-channel field-effect transistor, a source of the third transistor connected to a drain of the first transistor, a source of the fourth transistor connected to the drain of the second transistor, a gate of the third transistor connected to a gate of the fourth transistor, a drain of the fourth transistor connected to the gate of the fourth transistor. Each of the fifth and sixth transistors is implemented as an N-channel field-effect transistor, a source of the fifth transistor connected to a drain of the third transistor, a source of the sixth transistor connected to the drain of the fourth transistor, a gate of the fifth transistor connected to a gate of the sixth transistor, a drain of the fifth transistor connected to the gate of the fifth transistor. Each of the seventh and eighth transistors is implemented as an N-channel field-effect transistor, a source of the seventh transistor connected to the drain of the fifth transistor, a source of the eighth transistor connected to a drain of the sixth transistor, a gate of the seventh transistor connected to a gate of the eighth transistor, a drain of the seventh transistor connected to the gate of the seventh transistor. Each of the ninth and tenth transistors is implemented as a P-channel field-effect transistor, a source of the ninth transistor coupled to the regulating voltage, a gate of the ninth transistor connected to the gate of the second transistor, a drain of the ninth transistor connected to a source of the tenth transistor, a gate of the tenth transistor connected to the gate of the fourth transistor. And a drain of the tenth transistor outputs a band-gap reference voltage which is feedback to a second input of the charge pump circuit.

Optionally, in the band-gap reference circuit, further comprising a first triode and a second triode with each of the triodes being implemented as a PNP triode, and wherein an emitter of the first triode is connected to the drain of the seventh transistor, an emitter of the second triode is coupled to a drain of the eighth transistor, a collector and a base of the first triode are both grounded, and a collector and a base of the second triode are both grounded.

Optionally, in the band-gap reference circuit, further comprising a first resistor which is connected to the emitter of the second triode at one end and to the drain of the eighth transistor at the other end.

Optionally, in the band-gap reference circuit, further comprising a second resistor and a third triode which is implemented as a PNP triode, and wherein the second resistor is connected to the drain of the tenth transistor at one end and to an emitter of the third triode at the other end, and a collector and a base of the third triode are both grounded.

In the band-gap reference circuit provided in the present invention, the charge pump circuit converts, through energy accumulation of the charge pump circuit, the input low-level supply voltage into the output regulating voltage which is higher than the supply voltage and powers the reference circuit. As a result, the band-gap reference voltage output from the reference circuit output is kept stable and has improved accuracy and reliability.

Powering the reference circuit with the regulating voltage that is made higher than the supply voltage by the charge pump circuit enables 1) operation of the band-gap reference circuit at the supply voltage that is lower than a lowest voltage required by the band-gap reference circuit; and 2) minimization (almost elimination) of fluctuations in the regulating voltage output from the charge pump circuit and hence a stable and more accurate band-gap reference voltage output from the band-gap reference circuit.

In these figures: 10, a charge pump circuit; and 20, the reference circuit.

DETAILED DESCRIPTION

Band-gap reference circuit proposed in this invention will be described below in further detail with reference to the accompanying drawings and some specific embodiments. Features and advantages of the invention will be more apparent from the following detailed description, and from the appended claims. It is noted that the figures are provided in a very simplified form not necessarily presented to scale, with the only intention to facilitate convenience and clarity in explaining the embodiments of the invention.

The core concept of the present invention is to provide a band-gap reference circuit that can be powered by a supply voltage that is lower than a lowest voltage required by the band-gap reference circuit.

To this end, the invention provides a band-gap reference circuit comprising a charge pump circuit and a reference circuit. The charge pump circuit is powered by a supply voltage and thereby outputs a regulating voltage which is provided to the reference circuit, wherein the regulating voltage is higher than the supply voltage and powers the reference circuit such that the reference circuit outputs a band-gap reference voltage.

Figure 1:
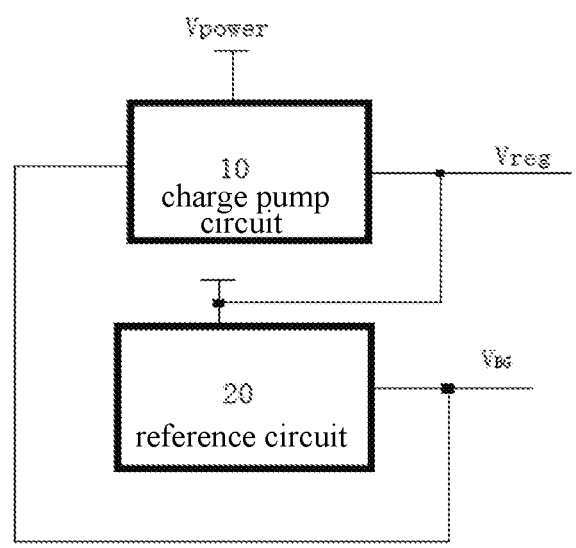
FIG. 1 is a schematic illustration of a band-gap reference circuit according to an embodiment of the present invention.

In the embodiment illustrated in FIG. 1, a band-gap reference circuit is provided. The band-gap reference circuit includes a charge pump circuit 10 and a reference circuit 20. The charge pump circuit 10 is powered by a supply voltage Vpower and thereby outputs a regulating voltage Vreg which is then provided to the reference circuit 20, wherein the regulating voltage Vreg is higher than the supply voltage Vpower and powers the reference circuit 20 such that the reference circuit 20 outputs a band-gap reference voltage $V_{BG}$. The band-gap reference voltage $V_{BG}$ may be fed back to the charge pump circuit 10 as a reference voltage of the charge pump circuit 10. The supply voltage Vpower may be 1.2 V, the regulating voltage Vreg may be 2.4V and the band-gap reference voltage $V_{BG}$ may be 1.2 V.

Figure 2:
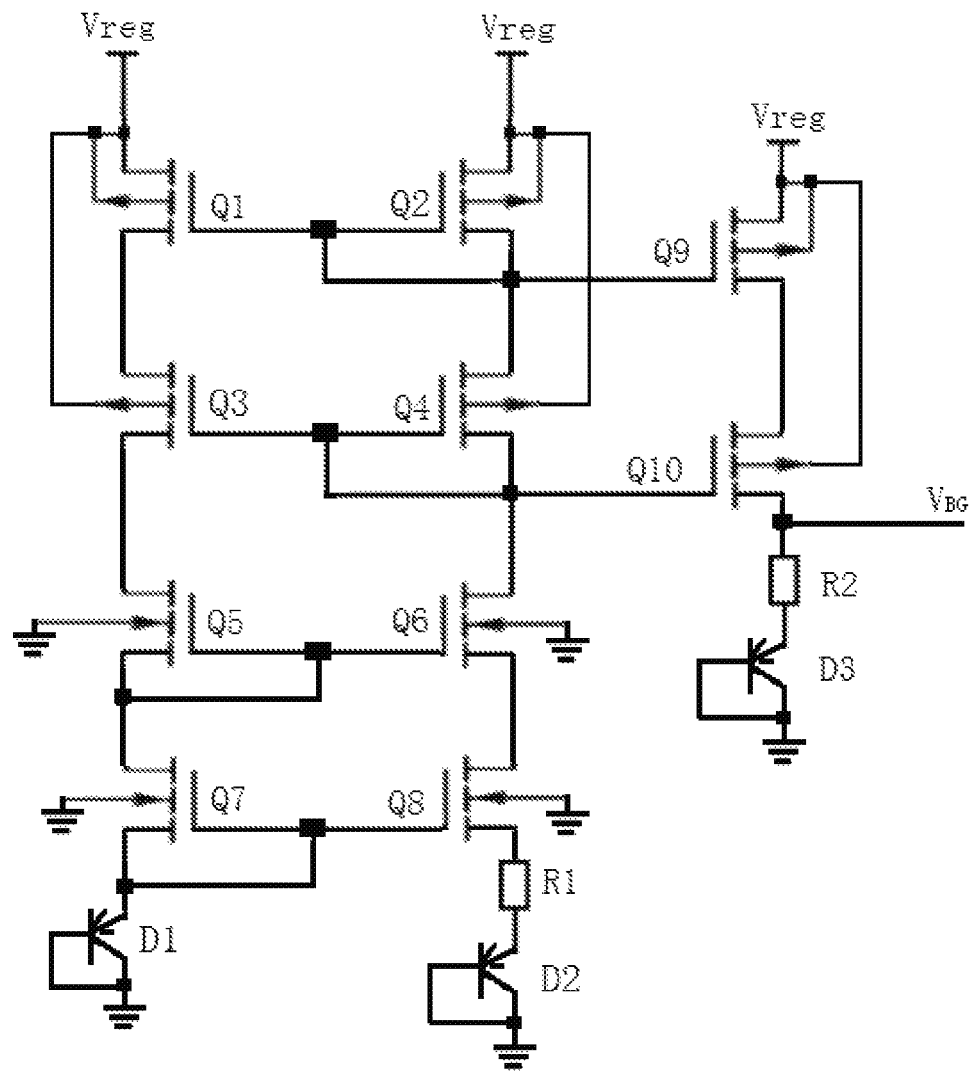
FIG. 2 is a schematic illustration of a reference circuit in the band-gap reference circuit according to an embodiment of the present invention.

Specifically, as shown in FIG. 2, in the band-gap reference circuit, the reference circuit 20 may include a first transistor Q1 and a second transistor Q2. Both of them may be implemented as P-channel field-effect transistors. The first transistor Q1 may have a source that is, together with a source of the second transistor Q2, coupled to the regulating voltage Vreg. A gate of the first transistor Q1 may be connected to a gate of the second transistor Q2. A drain of the second transistor Q2 may be connected to the gate of the second transistor Q2. The reference circuit 20 may further include a third transistor Q3 and a fourth transistor Q4. Both of the third transistor Q3 and the fourth transistor Q4 may be implemented as P-channel field-effect transistors. The third transistor Q3 may have a source connected to a drain of the first transistor Q1. The fourth transistor Q4 may have a source connected to the drain of the second transistor Q2. The third transistor Q3 may have a gate in connection with a gate of the fourth transistor Q4. The fourth transistor Q4 may have its drain connected to its gate.

The reference circuit 20 may further include a fifth transistor Q5 and a sixth transistor Q6. Both of them may be implemented as N-channel field-effect transistors. The fifth transistor Q5 may have a source connected to a drain of the third transistor Q3. The sixth transistor Q6 may have a source connected to the drain of the fourth transistor Q4. The fifth transistor Q5 may have a gate connected to a gate of the sixth transistor Q6, the fifth transistor Q5 having a drain connected to the gate of the fifth transistor Q5. The reference circuit 20 may further include a seventh transistor Q7 and an eighth transistor Q8. Both of the seventh transistor Q7 and the eighth transistor Q8 may be implemented as N-channel field-effect transistors. The seventh transistor Q7 may have a source connected to the drain of the fifth transistor Q5. The eighth transistor Q8 may have a source connected to a drain of the sixth transistor Q6. The seventh transistor Q7 may have a gate connected to a gate of the eighth transistor Q8. The seventh transistor Q7 may have a drain connected to the gate of the seventh transistor Q7. The reference circuit 20 may further include a first triode D1 and a second triode D2. Both of them are implemented as PNP triodes. the first triode D1 may have an emitter connected to the drain of the seventh transistor Q7. The second triode D2 may have an emitter coupled to a drain of the eighth transistor Q8, i.e. through a first resistor R1. Optionally, the reference circuit 20 may further include a first resistor R1, which is connected to the emitter of the second triode D2 at one end and connected to the drain of the eighth transistor Q8 at the other end. A collector and a base of the first triode D1 are grounded, and a collector and a base of the second triode D2 are also grounded.

Further, in the band-gap reference circuit, the reference circuit 20 may further include a ninth transistor Q9 and a tenth transistor Q10, both implemented as P-channel field-effect transistors, the ninth transistor Q9 having a source connected to the regulating voltage Vreg, a gate connected to the gate of the second transistor Q2 and a drain connected to a source of the tenth transistor Q10, the tenth transistor Q10 having a gate connected to the gate of the fourth transistor Q4. The reference circuit 20 may further include a second resistor R2 and a third triode D3. The third triode D3 may be implemented as a PNP triode, and the second resistor R2 may be connected to a drain of the tenth transistor Q10 at one end and to an emitter of the third triode D3 at the other end. A collector and a base of the third triode D3 may be grounded.

In the band-gap reference circuit provided in the present invention, although a level of the supply voltage Vpower is rather low, the charge pump circuit 10, through energy accumulation thereof, is able to output a regulating voltage Vreg which is higher than the supply voltage Vpower and is used to power the reference circuit 20. As a result, the band-gap reference voltage $V_{BG}$ output from the reference circuit 20 is kept stable and has improved accuracy and reliability.

Powering the reference circuit with the regulating voltage that is made higher than the supply voltage by the charge pump circuit enables 1) normal operation of the band-gap reference circuit at a supply voltage that is lower than a lowest voltage required by the band-gap reference circuit; and 2) minimization (almost elimination) of fluctuations in the regulating voltage output from the charge pump circuit and hence a stable and more accurate band-gap reference voltage output from the band-gap reference circuit.

In summary, various configurations of the band-gap reference circuit have been detailed in the above embodiments. Of course, the present invention includes, but not limited to, the configurations disclosed above, and any and all modifications made to these configurations are considered to fall within the scope of the invention. Those skilled in the art can extend the inventive ideas in many ways.

The description presented above is merely that of some preferred embodiments of the present invention and does not limit the scope thereof in any sense. Any and all changes and modifications made by those of ordinary skill in the art based on the above teachings fall within the scope as defined in the appended claims.

What is claimed is:

1. A band-gap reference circuit, comprising a charge pump circuit and a reference circuit, wherein the charge pump circuit is powered by a supply voltage and thereby outputs a regulating voltage which is provided to the reference circuit, wherein the regulating voltage is higher than the supply voltage and powers the reference circuit such that the reference circuit outputs a band-gap reference voltage, wherein the reference circuit comprises first to tenth transistors, a first triode and a second triode as well as a first resistor, and wherein:

each of the first and second transistors is implemented as a P-channel field-effect transistor, a source of the first transistor and a source of the second transistor coupled to the regulating voltage, a gate of the first transistor connected to a gate of the second transistor, a drain of the second transistor connected to the gate of the second transistor;

each of the third and fourth transistors is implemented as a P-channel field-effect transistor, a source of the third transistor connected to a drain of the first transistor, a source of the fourth transistor connected to the drain of the second transistor, a gate of the third transistor connected to a gate of the fourth transistor, a drain of the fourth transistor connected to the gate of the fourth transistor;

each of the fifth and sixth transistors is implemented as an N-channel field-effect transistor, a source of the fifth transistor connected to a drain of the third transistor, a source of the sixth transistor connected to the drain of the fourth transistor, a gate of the fifth transistor connected to a gate of the sixth transistor, a drain of the fifth transistor connected to the gate of the fifth transistor;

each of the seventh and eighth transistors is implemented as an N-channel field-effect transistor, a source of the seventh transistor connected to the drain of the fifth transistor, a source of the eighth transistor connected to a drain of the sixth transistor, a gate of the seventh transistor connected to a gate of the eighth transistor, a drain of the seventh transistor connected to the gate of the seventh transistor;

each of the ninth and tenth transistors is implemented as a P-channel field-effect transistor, a source of the ninth transistor coupled to the regulating voltage, a gate of the ninth transistor connected to the gate and the drain of the second transistor, a drain of the ninth transistor connected to a source of the tenth transistor, a gate of the tenth transistor connected to the gate and the drain of the fourth transistor;

a drain of the tenth transistor outputs a band-gap reference voltage which is feedback to a second input of the charge pump circuit;

each of the first triode and the second triode is implemented as a PNP triode, an emitter of the first triode directly connected to the drain of the seventh transistor, an emitter of the second triode coupled to a drain of the eighth transistor through the first resistor, a collector and a base of the first triode being both grounded, and a collector and a base of the second triode being both grounded.

2. The band-gap reference circuit of claim 1, wherein the supply voltage is 1.2 V, the regulating voltage is 2.4 V and the band-gap reference voltage is 1.2 V.

3. The band-gap reference circuit of claim 1, wherein the reference circuit further comprises a second resistor and a third triode which is implemented as a PNP triode, and wherein the second resistor is connected to a drain of the tenth transistor at one end and to an emitter of the third triode at the other end, and a collector and a base of the third triode are both grounded.

\* \* \* \* \*